Figure 1:
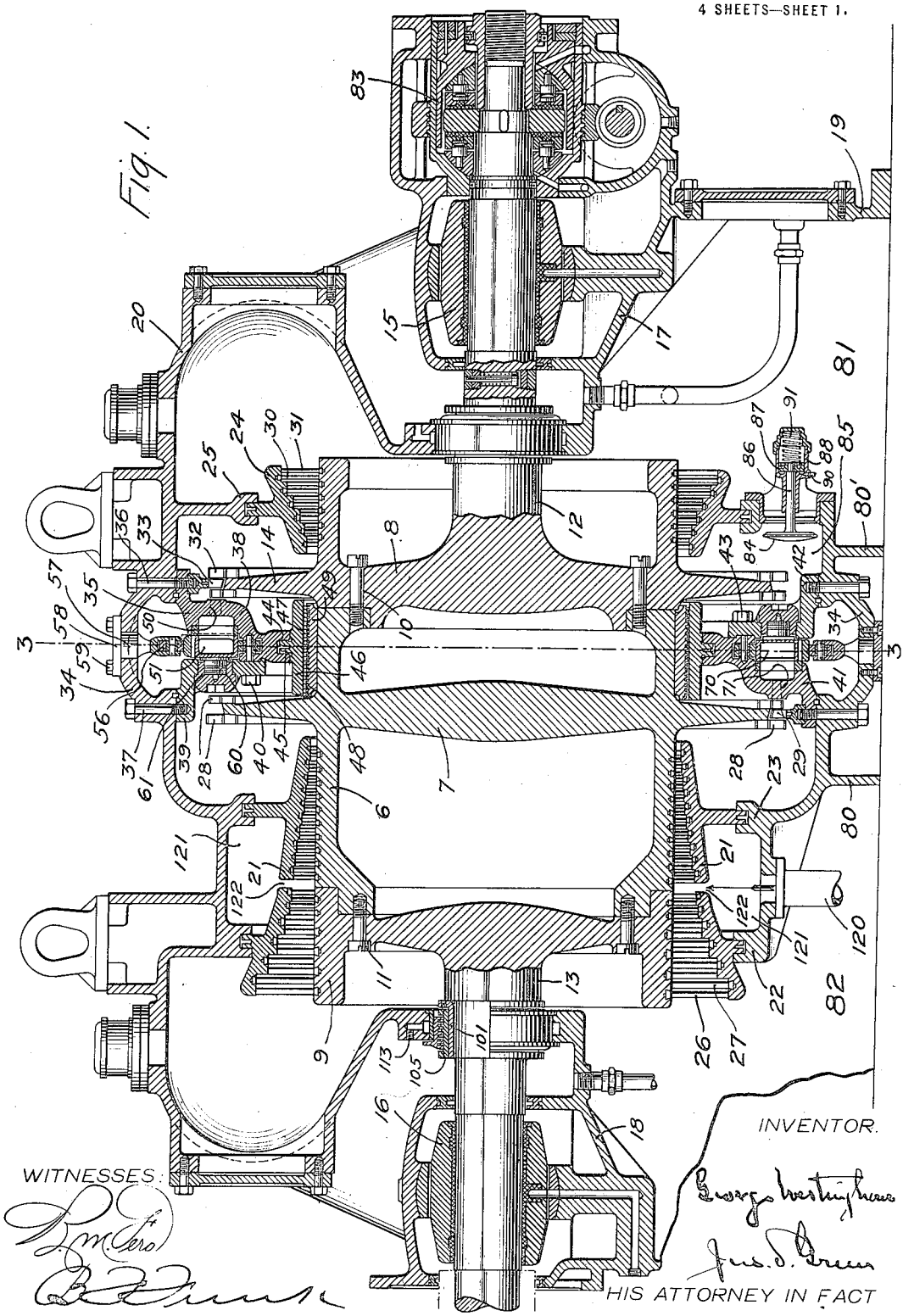

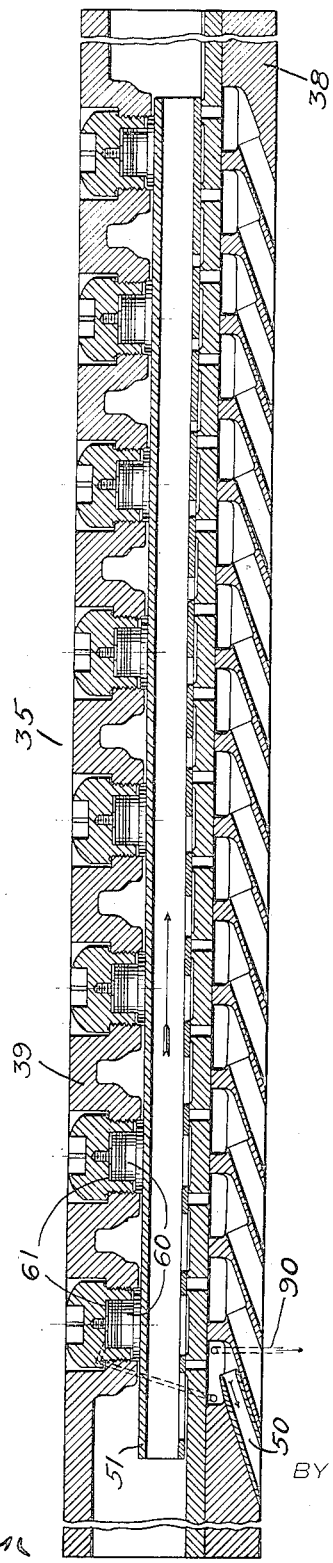

UNITED STATES PATENT OFFICE.

GEORGE WESTINGHOUSE, OF PITTSBURGH, PENNSYLVANIA, ASSIGNOR TO THE WESTINGHOUSE MACHINE COMPANY, OF EAST PITTSBURGH, PENNSYLVANIA, A CORPORATION OF PENNSYLVANIA.

MARINE TURBINE.

1,209,918.   Specification of Letters Patent.   Patented Dec. 26, 1916.

Application filed May 7, 1913. Serial No. 766,139.

*To all whom it may concern:*

Be it known that I, GEORGE WESTINGHOUSE, engineer, a citizen of the United States, and a resident of Pittsburgh, in the county of Allegheny and State of Pennsylvania, have made a new and useful Invention in Marine Turbines, of which the following is a specification.

This invention relates to elastic fluid turbines and more particularly to turbines for marine propulsion.

As it is practically necessary in the present state of the art of marine turbines to utilize one or more separate and complete turbines for driving the vessel astern, the reduction of over-all length becomes an important feature. Attempts to reduce the over-all length have led to the building of an organized apparatus comprising within one casing an ahead section or turbine and an astern section or turbine. In the most successful of these installations, so far as I am aware, the ahead section has exhausted toward the exhaust of the astern section and vice versa. This practice has some disadvantages, the principal one of which is that the exhaust from one section meets the blades of the other section, and these blades serve as a hydraulic brake and materially cut down the power and efficiency of the operating turbine. Another disadvantage is that the glands (that is, the packings where the rotor element passes through the casing) in such an installation are subject to varying relatively high steam pressures.

An object of this invention has been to produce a relatively simple compact marine turbine employing in one organized apparatus an ahead section and an astern section so constructed in the first place that the exhaust from one section will have no braking effect on the blades of the other section, and in the second place, so constructed that it will have a minimum over-all length for a maximum power and efficiency.

A still further object has been to provide a marine turbine having ahead and astern sections in which the controlling supply valves are located within the turbine casing at a point of minimum casing distortion and in a position where they occupy what heretofore might be called waste space.

These, as well as other objects which will readily appear to those skilled in this particular art, I attain in the device described in the specification and illustrated in the drawings accompanying the same and forming a part of this application and throughout which like elements are denoted by like characters.

Figure 2:
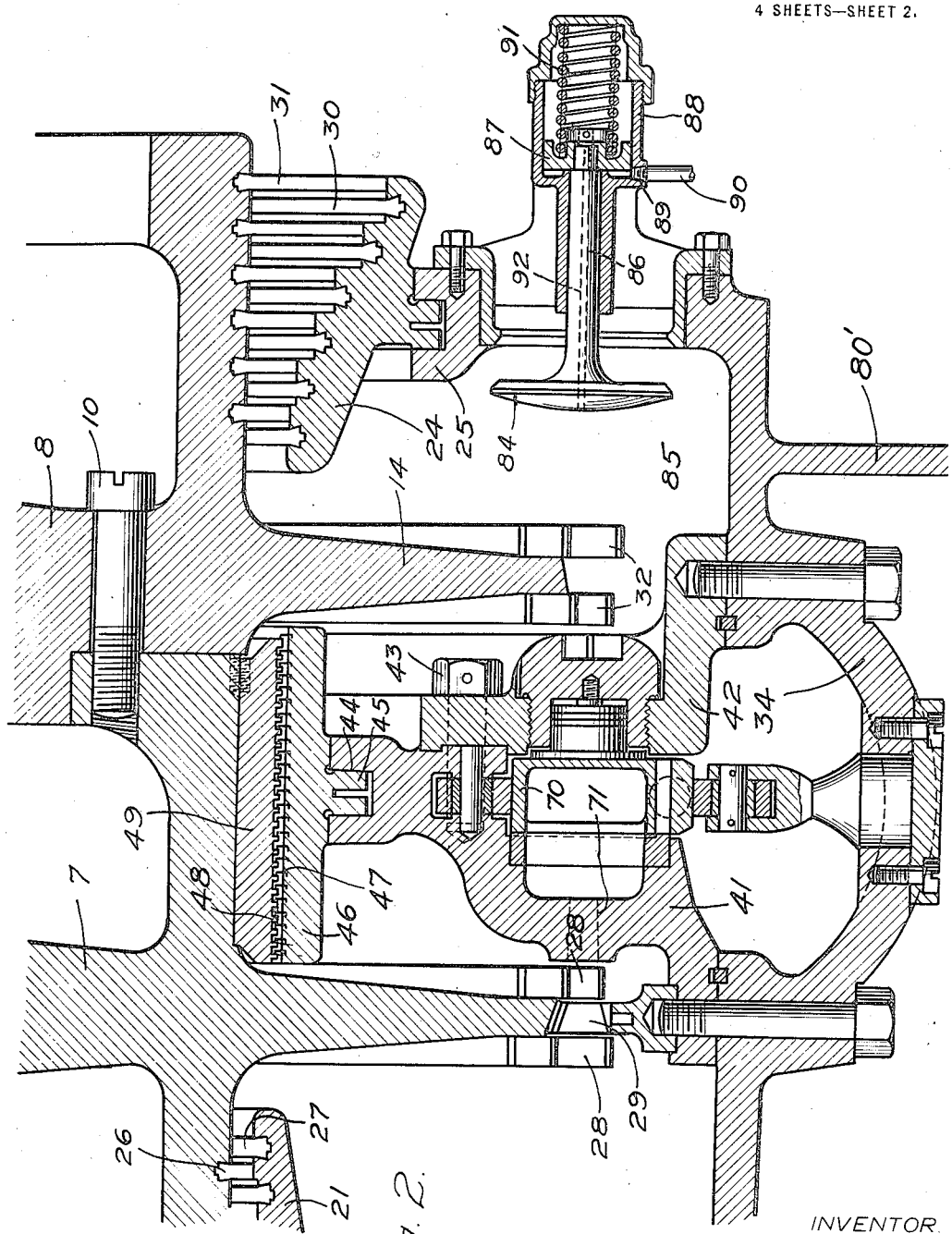
Figure 3:
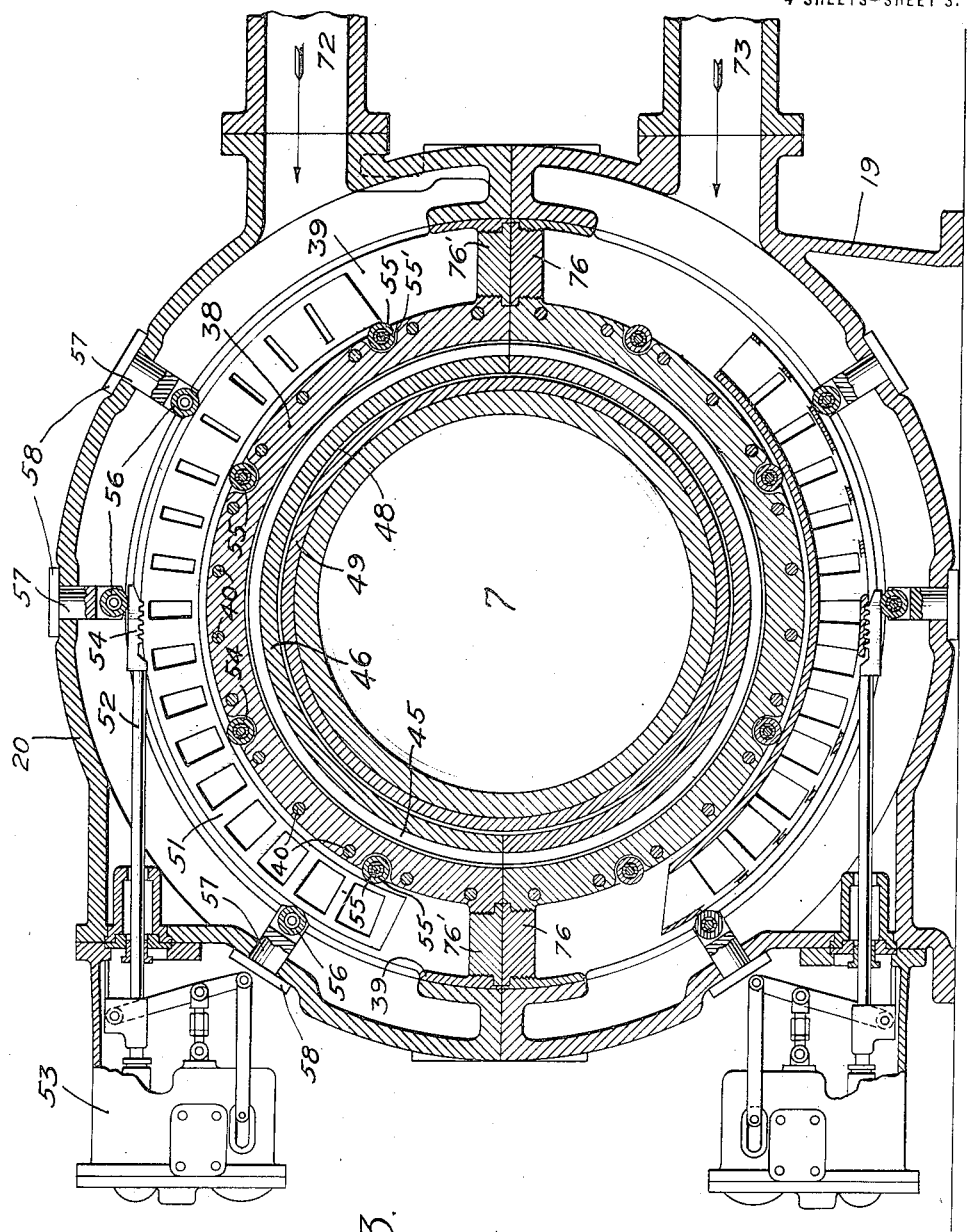

In the drawings: Figure 1 is a longitudinal sectional view of a turbine embodying this invention; Fig. 2 is a longitudinal sectional view of a portion of the turbine illustrated in Fig. 1; Fig. 3 is a cross-sectional view taken on line 3—3 of Fig. 1; Fig. 4 is a developed section of the controlling supply valves and discharge nozzles.

The turbine consists of a rotor element made up of a central section 6 provided with a through disk 7 and ends 8 and 9 bolted thereto at 10 and 11 and which carry shaft ends 12 and 13. End member 8 is formed with a through disk 14. The shaft ends 12 and 13 are journaled in suitable bearings 15 and 16 carried in extensions 17 and 18 of the lower part 19 of the turbine casing. The turbine casing, as is now common, is divided on a horizontal plane passing through its axis into the lower part 19 and a cover part 20.

A blade-carrying cylinder 21 for the ahead section formed in two parts divided on its horizontal axis is secured to flanges 22 and 23 formed in the turbine casing. A blade-carrying cylinder 24 for the astern section is secured within a flange 25 formed in the casing.

That part of the rotor element for the ahead section lying inside of blade cylinder 21 is preferably provided with a number of annular rows of blades 26 and the blade cylinder 21 is provided with rows of blades 27 which alternate with the rows 26. These blades are preferably of the reaction or Parson's type, that is, pressure drops in the steam occur both in the stationary blade passages and moving blade passages. Through-disk 7, which may be termed the running wheel for the ahead section, preferably carries two rows of impulse blades 28, and the casing for a portion of its circumference carries a row 29 of re-directing vanes, said row of re-directing vanes being located between the two rows of impulse blades 28.

The astern section comprises a number of rows 30 of blades carried by blade cylinder 24, and the rotor of the astern section carries a number of rows 31 of reaction blades which alternate with the rows 30. Disk 14, which may be termed the running wheel for the astern section, carries two rows 32 of impulse blades and between these and extending around a portion of the circumference of the casing a row of re-directing vanes 33 is located.

The turbine casing at a point between the running wheels for the ahead and the astern sections is curved outwardly to form a steam chest as shown at 34, and against the inner surface of the casing in line with this curved portion is a nozzle block member 35. This is secured to the casing by means of bolts 36 and 37 which pass through the casing and are threaded into the nozzle block section. The nozzle block member 35 extends entirely around the inner circumference of the casing, and like the casing, is divided on a horizontal plane passing through its horizontal axis. The upper half of the nozzle block member, which is made up of two parts 38 and 39 bolted together by means of bolts 40, carries the nozzles and the regulating supply valve for the astern section, while the lower half of the nozzle block member, which is made up of the two parts 41 and 42 secured together by means of bolts 43, carries the nozzles and regulating supply valve for the ahead section.

The inner face 44 of the nozzle block member is grooved to receive the tongue 45 of a sleeve 46 which carries a series of annular projections 47 which interleave with annular projections 48 formed on a sleeve 49 shrunk on to the turbine rotor between the running wheels to form a labyrinth packing system.

The inner faces of the flanges 22, 23 and 25 are of the same diameter in order that they may be conveniently bored, and these flanges are grooved to receive the flanges on the blade cylinders 21 and 24 in a tongue-and-groove manner; the flanges of the blade cylinders 21 and 24, in addition to the tongue-and-groove connections, are securely bolted thereto.

Member 38 of the upper half of the nozzle block member is provided with nozzles 50 for the astern section and these nozzles are controlled by means of a valve 51 (in certain respects similar to the valve disclosed in my application Serial No. 684,738, filed March 19, 1912), which is adapted to be slid on the arc of a circle within the nozzle block member by means of a connecting rod 52 of a valve motor 53, said rod extending tangentially of the valve and having connected thereto at 54 a toothed element similar to a rack and pinion.

The valve is internally supported, that is, supported along its inner circumference, by means of rollers 55 carried on pins 55' and is externally supported along its outer surface by means of rollers 56 carried by studs 57 extending inwardly through the steam chest from the outside of the turbine casing. These studs are provided with end plates 58 bolted at 59 to the casing.

The valve 51 is balanced by means of steam-actuated pistons 60 reciprocable within cylinders 61 threaded into the nozzle block member.

As the valve 70 for the ahead section controlling nozzles 71 is similar in all respects to valve 51, it is believed that a detailed description thereof is unnecessary.

The steam chest for the astern section, which is supplied with steam through inlet port 72, is divided from the steam chest of the ahead section which is supplied with steam through inlet port 73 by means of two plugs 76 and 76' threaded into the two halves of the nozzle block members.

The blade cylinders 21 and 24 are provided with flanges 80 and 80' which extend to the bottom of the turbine casing and separate the exhaust port 81 of the astern section from the exhaust port 82 of the ahead section. These flanges and the nozzle blocks form partitions between these two exhausts, and, if desirable, the space therebetween may be packed with material such as mineral wool in order to further prevent heat transfer from one exhaust to the other.

In order to relieve the turbine rotor of any unbalanced end or longitudinal thrust due to the pressures in the active section (that is, due to the pressures in the ahead section when the astern section is inactive, or those in the astern section when the ahead section is inactive), a thrust bearing 83 of any desired form is used.

A relief valve 84 is provided for the astern section and connects the interior space 85 of said section to the astern exhaust 81 during the operation of the ahead section. The stem 86 of this valve 84 is connected to a piston 87 reciprocable within a cylinder 88 and said cylinder at 89 is connected to the valve chamber of the astern section by means of a pipe 90, so that when the first nozzle controlled by said valve is opened steam pressure will enter the cylinder through pipe 90 and close the valve 84 in opposition to spring 91 located within said cylinder. The valve at this time will have a tendency to remain closed due to the difference in pressures between chamber 85 and the exhaust 81. Any steam entering the cylinder through pipe 90 leaking past piston 87 will pass out through passage 92 drilled through valve stem 86 and valve 84 to chamber 85, and with the steam in said chamber do useful work through the reaction blades of the astern section.

As there are always a number of auxiliaries on a ship which run non-condensing, it is desirable to utilize the exhaust therefrom, and for that purpose I provide an inlet 120 which leads this exhaust steam to the inlet of what may be termed the low pressure section of the ahead turbine through chamber 121 formed between the casing and the blade-carrying cylinder 21 by the supporting flanges for the blade-carrying section, and to the inlet of said low pressure section through a number of inlet openings 122 formed through the blade-carrying drum 21.

In accordance with the provisions of the patent statutes I have described the principle of operation of my invention together with the device which I now consider to represent the best embodiment thereof, but I desire to have it understood that the device shown is only illustrative and that the invention can be carried out in other ways.

Having thus described my invention, what I claim is:

1. In an elastic fluid turbine, a rotor, a casing, a steam chest, a portion of which is formed in said casing, a nozzle block bolted to said casing and completing said steam chest, and a labyrinth packing one portion of which is carried by said nozzle block and interleaves with a portion carried on the rotor.

2. In an elastic fluid turbine, a rotor, a casing therefor, a valve formed so as to slide on the arc of a circle between said casing and said rotor, and rollers engaging the inner peripheral face of the valve for supporting said valve radially.

3. In an elastic fluid turbine, a rotor, a casing, a valve adapted to slide on the arc of a circle between said rotor and casing, and rollers mounted on the casing and engaging the inner and outer peripheral faces of the valve, for supporting the valve.

4. In a marine turbine having an ahead section and an astern section with a packing between said sections, a valved passage between the steam space of the astern section and the astern section exhaust, and means for closing said passage simultaneously with the admission of steam through the astern section.

5. In a marine turbine, ahead and astern sections, a labyrinth packing between said sections, and a partition for preventing the exhaust passages of the ahead and the astern sections from communicating within the turbine casing.

6. In a marine turbine, ahead and astern sections, a labyrinth packing between said sections, a casing for said sections, and distributing valves between said casing and said labyrinth packing.

7. In a marine turbine, ahead and astern sections, a partition dividing the exhausts of said sections, and means within said partition for minimizing heat transfer between said exhausts.

8. In a marine turbine, an ahead section comprising a bladed drum section, an impulse wheel of materially greater diameter than said drum section, an astern section comprising a bladed drum section, an impulse wheel of materially greater diameter than said drum section, a labyrinth packing located between said impulse wheels for balancing the drum section in operation, and steam distribution devices located between said impulse wheels and between the turbine casing and said labyrinth packing.

9. A marine turbine comprising an impulse wheel, a bladed drum for the ahead section, an impulse wheel and a bladed drum for the astern section, a labyrinth packing between said impulse wheels, and a thrust bearing on the turbine rotor.

10. In a marine turbine, an ahead section and an astern section, steam distribution devices between said sections, a labyrinth packing located between the turbine rotor and said steam distribution devices, and a partition separating the exhausts from said sections.

11. In a turbine, a high pressure stage communicating with the turbine inlet, a low pressure stage communicating with the turbine exhaust and with the high pressure stage, a valve mechanism for delivering fluid from the inlet to the turbine and means responsive to the opening and closing of said valve for establishing and cutting off direct communication between the turbine exhaust and the high pressure stage.

12. In a turbine, a high pressure stage communicating with the turbine inlet, a stage of lower pressure for receiving motive fluid from the high pressure stage and communicating with the turbine exhaust, means for controlling the delivery of fluid from the inlet to the high pressure stage and a pressure actuating valve responsive to the delivery of pressure to the high pressure stage for directly connecting the high pressure stage with the turbine exhaust.

13. In combination in a turbine, a working section communicating at one end with the turbine inlet and at the other end with the turbine exhaust and a pressure actuated valve responsive to variations in pressure at the inlet end of said section for directly connecting the inlet end of the section with the turbine exhaust.

14. In a turbine, a rotor, a stator surrounding the rotor, blades mounted on the rotor, annular vane-carrying elements surrounding the rotor and forming with said stator an auxiliary fluid delivery chamber which communicates with an auxiliary inlet port formed in the stator, and vanes mounted on said elements and coöperating with said blades.

15. In combination in a turbine, a rotatable blade-carrying element, a casing surrounding said element and provided with a main admission port, an auxiliary admission port and an exhaust port, annular vane-carrying members axially alined with the blade-carrying member and secured to said casing by means of mounting flanges and a chamber communicating with the auxiliary inlet port formed within the casing by said flanges.

16. In combination in a turbine, an ahead section and an astern section located in the casing of the ahead section and comprising a high pressure stage, a low pressure stage communicating with an exhaust port formed in the casing and receiving fluid from the high pressure stage, and a relief valve between the high pressure stage and said exhaust port for placing the high pressure stage in direct communication with said port when the reverse turbine section is running idle.

17. In combination in a turbine, a rotor, a casing surrounding the rotor and having a port formed therein, annular vane carrying members secured to the casing, in coaxial alinement with said rotor, and spaced apart so as to form a means of communication between said port and the working passage of the turbine.

18. In combination in a turbine, a rotor, blades mounted on said rotor, a casing inclosing the rotor and provided with a fluid inlet, an exhaust, and a port adapted to communicate with the working passage of the turbine at a point intermediate the inlet and exhaust ends thereof, two annular vane carrying members mounted on the casing, surrounding the rotor and spaced longitudinally to provide an annular passage between adjacent ends of the members for placing said port in communication with the working passage of the turbine, and vanes mounted on said members for coöperating with said blades.

In testimony whereof, I have hereunto subscribed my name this 2nd day of May, 1913.

GEO. WESTINGHOUSE.

Witnesses:
C. W. McGHEE,
ADA ROMIG.